(12) United States Patent
Herrmann

(10) Patent No.: US 6,688,231 B1
(45) Date of Patent: Feb. 10, 2004

(54) CORD-TYPE GAS GENERATOR

(75) Inventor: Günter Herrmann, Feldkirchen (DE)

(73) Assignee: Autoliv Development AB (SE)

( * ) Notice: Subject to any disclaimer, the term of this patent is extended or adjusted under 35 U.S.C. 154(b) by 17 days.

(21) Appl. No.: 10/048,816
(22) PCT Filed: Jul. 26, 2000
(86) PCT No.: PCT/EP00/07129
§ 371 (c)(1), (2), (4) Date: Feb. 1, 2002
(87) PCT Pub. No.: WO01/08937
PCT Pub. Date: Feb. 8, 2001

(30) Foreign Application Priority Data

Aug. 2, 1999 (DE) .......................... 199 36 285

(51) Int. Cl.[7] .................................. C06C 5/00
(52) U.S. Cl. .................................. 102/275.1
(58) Field of Search .............. 102/275.1, 275.8, 102/289, 286

(56) References Cited

U.S. PATENT DOCUMENTS

| 927,968 | A | * | 7/1909 | Harle | 102/275.4 |
|---|---|---|---|---|---|
| 2,113,004 | A | * | 4/1938 | Snelling | 102/275.8 |
| 2,877,708 | A | * | 3/1959 | Rey | 102/275.8 |
| 3,411,446 | A | * | 11/1968 | Michael, III | 102/275.1 |
| 3,590,739 | A | * | 7/1971 | Persson | 102/275.5 |
| 3,730,096 | A | * | 5/1973 | Prior | 102/275.8 |
| 4,080,902 | A | * | 3/1978 | Goddard et al. | 102/200 |
| 4,094,248 | A | * | 6/1978 | Jacobson | 102/288 |
| 4,220,087 | A | * | 9/1980 | Posson | 102/275.6 |
| 4,386,569 | A | * | 6/1983 | Deas | 102/292 |
| 4,838,165 | A | * | 6/1989 | Gladden et al. | 102/275.8 |
| 4,876,962 | A | * | 10/1989 | Olsson | 102/288 |
| 4,896,898 | A | * | 1/1990 | Lenzen et al. | 280/735 |
| 4,911,077 | A | * | 3/1990 | Johansson et al. | 102/289 |
| 5,002,308 | A | * | 3/1991 | Lenzen et al. | 280/735 |
| 5,540,154 | A | * | 7/1996 | Wilcox et al. | 102/275.1 |
| 5,597,973 | A | * | 1/1997 | Gladden et al. | 102/289 |
| 5,804,758 | A | * | 9/1998 | Marsaud et al. | 102/288 |
| 5,821,449 | A | * | 10/1998 | Langsjoen et al. | 102/288 |
| 5,827,994 | A | * | 10/1998 | Gladden et al. | 102/275.8 |
| 5,837,924 | A | * | 11/1998 | Austin | 102/275.8 |
| 6,170,399 | B1 | * | 1/2001 | Nielson et al. | 102/336 |
| 6,347,566 | B1 | * | 2/2002 | Rabotinsky et al. | 86/1.1 |
| 6,354,218 | B1 | * | 3/2002 | Weise et al. | 102/286 |
| RE37,843 | E | * | 9/2002 | Blumenthal et al. | 280/737 |

FOREIGN PATENT DOCUMENTS

| DE | 29 46 422 | 9/1980 |
|---|---|---|
| DE | 3932576 | 4/1992 |
| EP | 0728630 | 8/1996 |
| WO | WO 00/32447 | 6/2000 |

* cited by examiner

Primary Examiner—Charles T. Jordan
Assistant Examiner—Jordan M. Lofdahl
(74) Attorney, Agent, or Firm—R W Becker & Associates; R W Becker

(57) ABSTRACT

The invention relates to a cord-type gas generator, comprising a solid propellant strand (10) consisting of a gas-generating material, located in a sleeve (12) and a detonation element (18). The solid propellant strand (10) is positioned in the sleeve (12) in such a way, that continuous channels (19) are configured between the sleeve (12) and the solid propellant strand (10) for the formation of a detonation shock wave. The gas generator is characterised in that the solid propellant strand (10) has a reduced woven thickness (W), achieved by the introduction of gaps into the material (slits 13, pores 14), in order to reduce its burn time.

17 Claims, 2 Drawing Sheets

CORD-TYPE GAS GENERATOR

BACKGROUND OF THE INVENTION

The present invention relates to a cord-type gas generator that comprises a solid propellant strand that is disposed in a sleeve and comprises a gas-generating material, with the gas generator also comprising an ignition means, whereby the solid propellant strand is disposed in the sleeve in such a way that channels are formed that extend between the sleeve and the solid propellant strand and that are suitable for the formation of an ignition shock wave.

A cord-type gas generator having the aforementioned features is described in DE 39 32 576 C2. The known cord-type gas generator comprises a solid propellant strand having a star-shaped arrangement of individual strands, which are surrounded by a sleeve. Formed between the solid propellant strand and the sleeve are channels in which an ignition shock wave, which is established upon ignition of the solid propellant strand, can expand along the cord-type gas generator. The outer side of the solid propellant strand, which comprises a mixture of binder, perchlorate as well as, if necessary, nitrate, is provided with a coating of explosive that serves as an ignition means and that is ignited via an ignition pulse. The ignition shock wave that results during combustion of the fuel then takes care of the ignition of the solid propellant strand over the entire length thereof.

The known cord-type generator has the drawback that the combustion of the solid propellant takes place too slowly. A further drawback is that the explosive coating of the solid propellant strand makes it difficult, for safety reasons, to use the cord-type gas generator in safety systems of motor vehicles.

It is therefore an object of the present invention to increase the rate of combustion of a cord-type gas generator having the aforementioned features.

SUMMARY OF THE INVENTION

This object, including advantageous configurations and embodiments, is realized from the content of the patent claims that follow this specification.

The basic concept of the present invention is that the solid propellant strand, in order to reduce its combustion time, is provided with a reduced woven or material thickness that is established by introducing gaps in the material. To the extent that, as the woven thickness, there is defined the material thickness of the compact strand, which is determined in the cross-section of the solid propellant strand, a reduced material thickness is inventively established in that gaps in the material are introduced into the solid propellant strand, with these gaps dividing the known, compact solid propellant strand, so that the combustion time of the solid propellant strand is reduced.

Pursuant to specific embodiments of the present invention, these gaps in the material are produced by the formation of pores or voids, or by separately introduced interruptions, for example in the form of slits.

To the extent that it is known from the aforementioned DE 39 32 576 C2 for the solid propellant strand to be composed of a plurality of individual arms, it is provided pursuant to one embodiment of the present invention that the individual arms have differing thicknesses, or in addition or alternatively thereto, also have a differing composition of the solid propellant. In this way, the individual arms of the cord-type gas generator can generate gas over different lengths of time, so that, when using the cord-type gas generator for inflating an air bag, the air bag on the one hand reacts rapidly, but at the same time is inflated more gently.

This objective can also be realized by forming the solid propellant strand in the shape of individual strands that are separated from one another and that pursuant to specific embodiments of the invention can have a circular or also a ring-shaped cross-section. In particular, also provided is a combination of different cross-sections of the individual strands that are disposed in a sleeve. Just as with the individual arms, the individual strands can also respectively have a different material thickness, or in addition or alternatively thereto, can also have a different composition of the solid propellant.

To avoid the use of explosive, it is provided pursuant to one specific embodiment that as an ignition means a pyrotechnical mixture be used that in particular is produced on the base of boron, $KNO_3$ and aluminum. This pyrotechnical mixture can be disposed on the outer side of the solid propellant strand, or alternatively or in addition thereto on the inner side of the sleeve that encircles the solid propellant strand. Depending upon the manufacture or consistency of the pyrotechnical mixture, the mixture can be disposed in dry powder form on the solid propellant stand and/or on the sleeve, or can also be applied as a dryable slurry.

With regard to the formation of the solid propellant strand, and the sleeve that encircles the individual strands thereof, the sleeve, as is already known from the aforementioned DE 39 32 576 C2, can comprise a material that burns along with the combustion of the solid propellant stand. Alternatively, the sleeve can comprise a reinforced woven material that either rips open during combustion of the solid propellant strand due to the resulting gas pressure, or that is provided with openings for the passage of the gases generated during the combustion of the solid propellant strand.

BRIEF DESCRIPTION OF THE DRAWINGS

Specific embodiments of the present invention are provided in the drawings, which are described subsequently. The drawings show.

DESCRIPTION OF PREFERRED EMBODIMENTS

Figure 1:
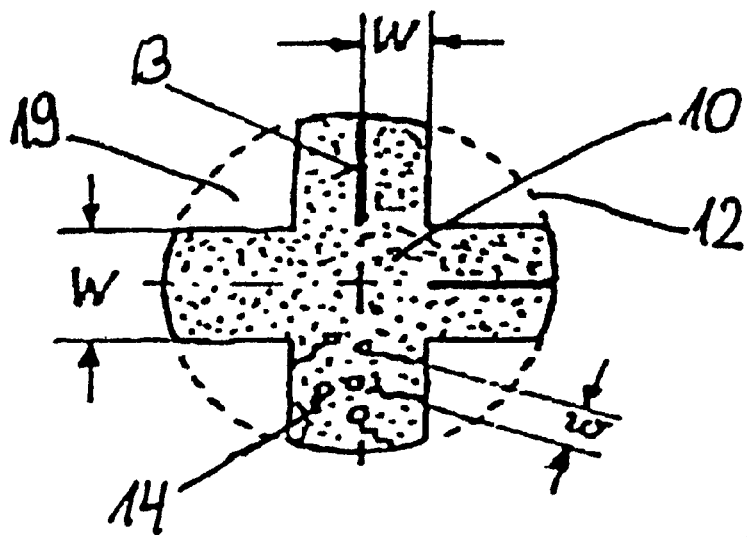
FIG. 1 a cross-sectional view of a cord-type gas generator.

The cord-type gas generator illustrated in FIG. 1 comprises a solid propellant strand 10 that is provided with four individual arms that are arranged in the shape of a cross. The solid propellant strand 10 is encircled by a sleeve 12, so that channels 19 are formed in the wedge-shaped spaces that exist between the sleeve 12 and the arms of the solid propellant strand 10; upon ignition of the cord-type gas generator, the ignition or detonation shock wave that is produced via the ignition means can expand in the channels.

As can be seen from the arm of the solid strand propellant 10 that projects to the left in the illustration of FIG. 1, the woven or arm thickness W defines the material thickness of the compact propellant, which thickness is determined by the cross-section of the strand 10. Formed in the arms of the solid propellant strand that project upwardly and to the right are respective, central splits or interruptions 13 as slits, so that in this case the woven thickness W has only half of the woven thickness W of the left arm due to the central arrangement of the interruptions 13 in the respective arm. In the downwardly projecting arm, the material gaps are formed as voids 14, whereby with this embodiment the woven thickness W is defined as the shortest distance between two voids.

Figure 2:
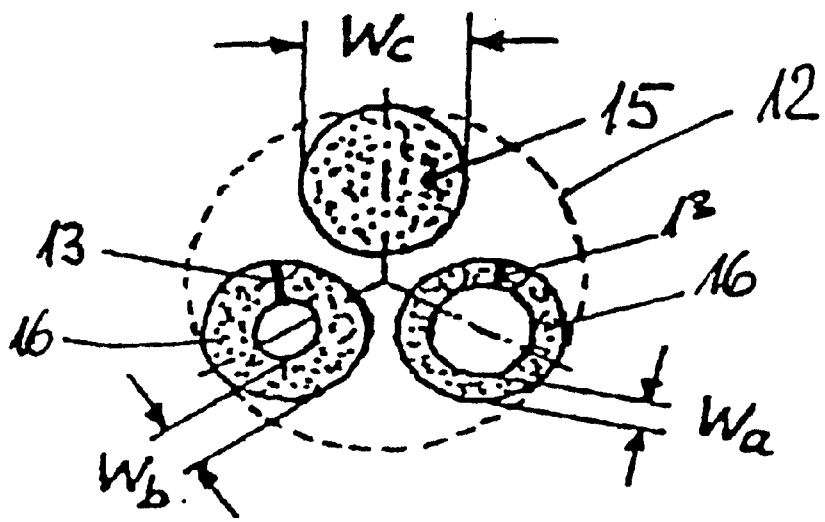
FIG. 2 another embodiment of the subject matter of FIG. 1.

In the embodiment illustrated in FIG. 2, three individual strands that are separated from one another are arranged within the sleeve 12, of which one individual strand 15 has a circular cross-section, while two further individual strands 16 each have a ring-shaped cross-section with a different thickness of the annular solid propellant. In this case, the woven thickness W is on the one hand defined by the diameter of the individual strand 15 having the circular cross-section, or by the thickness of the ring-shaped individual strands 16. In addition, radially extending splits or interruptions 13 are also provided in the two ring-shaped individual strands 16.

Figure 3:
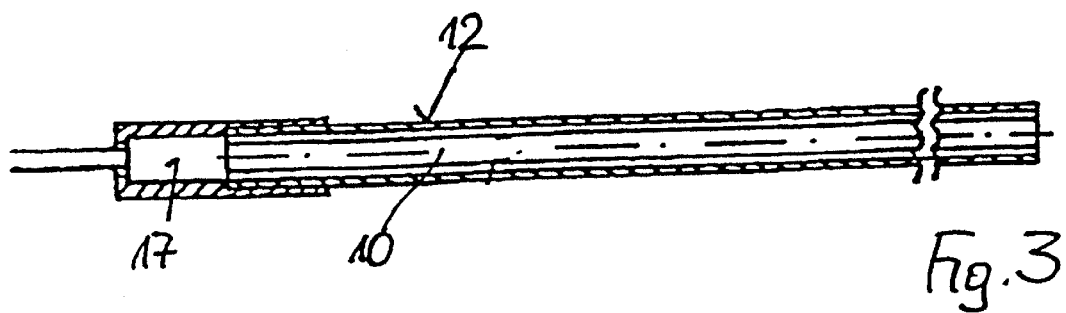
FIG. 3 a cross-sectional side view of a cord-type gas generator.
Figure 4:
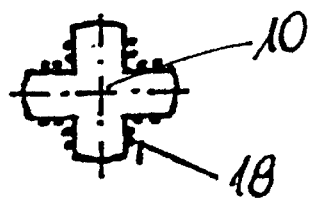
FIG. 4 a cross-sectional view of the subject matter of FIG. 3.

The illustration of FIG. 3 shows a corresponding cord-type gas generator in a side view, whereby at one end of the cord-type gas generator there is disposed an initiator 17 via which the ignition pulse is produced or transmitted. Adjoining the initiator 17 is the sleeve 12, in the interior of which is disposed the solid propellant strand 10. As can be seen from FIG. 4, the solid propellant strand 10 basically has the shape of the solid propellant strand illustrated in FIG. 1, whereby the ignition means or agent 18 is disposed on the outer side of the solid propellant strand. This ignition means comprises a pyrotechnical mixture that is produced on the base of boron, $KNO_3$ and aluminum. The pyrotechnical mixture can be applied as a dry powder or as a dryable slurry. However, it must be ensured that in cooperation with the shock wave that is triggered by the initiator 17 and that passes though the channels 19 of the cord-type gas generator, a reactive dust mixture, air mixture is established that uniformly ignites the elongated solid propellant strand 10 within a short period of time over its length. On the other hand, the ignition means 18 must not prematurely detach due to environmental influences or a lengthy storage of the cord-type gas generator and obstruct the expansion of the shock wave.

In a manner known per se, utilized as solid propellant are composite propellants that also continue to burn at low pressures due to the opening of the sleeve 12 as a consequence of the resulting gas pressure, and that do not extinguish due to the sudden release of pressure. Such composite propellants can comprise, for example, a mixture of ammonium perchlorate, sodium nitrate and a polymeric binder, whereby in place of the polymeric binder, in order to reduce the CO problem, it would also be possible to use energetic binders such as, for example, glycidyl azide polymer (GAP).

The features of the subject matter of these documents disclosed in the preceding specification, the patent claims, the abstract and the drawings can be important not only individually but also in any desired combination for the realization of the invention in its various embodiments.

The specification incorporates by reference the disclosure of German priority document 199 36 285.8 filed Aug. 2, 1999 and International priority document PCT/EP00/07129 of Jul. 26, 2000.

The present invention is, of course, in no way restricted to the specific disclosure of the specification and drawings, but also encompasses any modifications within the scope of the appended claims.

What is claimed:

1. A cord-type gas generator, comprising a sleeve;

a solid propellant strand disposed in said sleeve and comprising a gas-generating material, wherein said solid propellant strand is disposed in said sleeve in such a way that channels are formed between said sleeve and said solid propellant strand that are suitable for the formation of an ignition shock wave, and wherein, to reduce a burn time of said solid propellant strand, said solid propellant strand is provided with gaps in the material thereof to provide a reduced thickness of said material; and ignition means.

2. A cord-type gas generator according to claim 1, wherein said reduced material thickness is established by means of interruptions formed in said solid propellant strand.

3. A cord-type gas generator according to claim 1, wherein said solid propellant strand is composed of a plurality of individual arms, which have differing material thicknesses.

4. A cord-type gas generator according to claim 2, wherein said individual arms have a different composition of solid propellant.

5. A cord-type gas generator according to claim 3, wherein said solid propellant strand, which is disposed in said sleeve, comprises individual strands that are separated from one another.

6. A cord-type gas generator according to claim 5, wherein said individual strands have a circular cross-section.

7. A cord-type gas generator according to claim 5, wherein said individual strands have a ring-shaped cross-section.

8. A cord-type gas generator according to claim 1, wherein said ignition means is a pyrotechnical mixture.

9. A cord-type gas generator according to claim 8, wherein said pyrotechnical mixture is formed on a base of boron, $KNO_3$ and aluminum.

10. A cord-type gas generator according to claim 8, wherein said pyrotechnical mixture is applied to an outer side of said solid propellant strand.

11. A cord-type gas generator according to claim 8, wherein said pyrotechnical mixture is applied to an inner side of said sleeve.

12. A cord-type gas generator according to claim 8, wherein said pyrotechnical mixture is applied as a dry powder.

13. A cord-type gas generator according to claim 8, wherein said pyrotechnical mixture is applied as a dryable slurry.

14. A cord-type gas generator according to claim 1, wherein said sleeve is comprised of a material that burns during combustion of said solid propellant strand.

15. A cord-type gas generator according to claim 1, wherein said sleeve comprises a reinforced woven material.

16. A cord-type gas generator according to claim 15, wherein said sleeve rips open during combustion of said solid propellant strand.

17. A cord-type gas generator according to claim 15, wherein said sleeve is provided with openings for passage of gas generated during combustion of said solid propellants strand.

* * * * *